United States Patent
Lau

(10) Patent No.: US 8,141,702 B2
(45) Date of Patent: Mar. 27, 2012

(54) SECURITY DISK PROTECTIVE ENCLOSURE

(75) Inventor: Kwok Din Lau, Hong Kong (CN)

(73) Assignee: Finest Products Limited, Hong Kong (CN)

( * ) Notice: Subject to any disclaimer, the term of this patent is extended or adjusted under 35 U.S.C. 154(b) by 29 days.

(21) Appl. No.: 12/821,055

(22) Filed: Jun. 22, 2010

(65) Prior Publication Data

US 2011/0139641 A1    Jun. 16, 2011

Related U.S. Application Data

(63) Continuation of application No. 11/465,687, filed on Aug. 18, 2006, now abandoned.

(51) Int. Cl.
B65D 85/57 (2006.01)
B65D 85/30 (2006.01)
(52) U.S. Cl. ............ 206/308.1; 206/1.5; 206/308.2
(58) Field of Classification Search ........... 206/308.1, 206/309, 310, 312, 387.13, 472, 473, 232, 206/308.2, 1.5; 211/40, 44.12
See application file for complete search history.

(56) References Cited

U.S. PATENT DOCUMENTS

| | | | |
|---|---|---|---|
| 4,469,225 A * | 9/1984 | Takahashi | 206/1.5 |
| 5,400,902 A | 3/1995 | Kaminski | |
| 5,494,156 A | 2/1996 | Nies | |
| 5,526,926 A | 6/1996 | Deja | |
| 5,586,651 A | 12/1996 | Krummenacher | |
| 5,727,680 A | 3/1998 | Liu | |
| 5,944,181 A | 8/1999 | Lau | |
| 6,065,594 A | 5/2000 | Sankey et al. | |
| 6,123,192 A | 9/2000 | Rufo, Jr. | |
| 6,196,384 B1 | 3/2001 | Belden, Jr. | |
| 6,202,454 B1 * | 3/2001 | Nakasuji | 206/1.5 |
| 6,237,763 B1 | 5/2001 | Lau | |
| 6,364,108 B1 | 4/2002 | Bin | |
| 6,425,481 B1 | 7/2002 | Choi | |
| 6,427,833 B1 | 8/2002 | Hui | |
| 6,554,132 B2 | 4/2003 | Lau | |
| 6,672,455 B2 | 1/2004 | Belden, Jr. et al. | |
| 6,719,133 B2 | 4/2004 | Perez et al. | |

(Continued)

FOREIGN PATENT DOCUMENTS

AU   2003229251 A   11/2004

(Continued)

OTHER PUBLICATIONS

The International Search Report and the Written Opinion of the International Searching Authority, International Application No. PCT/CN2007/070508, Date of Mailing Nov. 29, 2007.

(Continued)

Primary Examiner — J. Gregory Pickett
Assistant Examiner — Andrew Perreault
(74) Attorney, Agent, or Firm — Sheldon Mak & Anderson PC; Danton K. Mak

(57) ABSTRACT

A container for a disk having a central opening includes a base having a pedestal for holding the disk, a hingedly connected lid, and a laterally spaced pair of latches for locking the container closed. Also disclosed are interior partitions of the base and lid that have edgewise proximal engagement, a disk presser structure for holding edge extremities of the disk in place during mishandling of the container, and rib members that block entry of a destructive blade in an endwise path through regions of facing contact adjacent to living hinges of the container.

3 Claims, 5 Drawing Sheets

U.S. PATENT DOCUMENTS

| | | | |
|---|---|---|---|
| 6,752,266 | B2 | 6/2004 | Ku |
| 6,799,679 | B2 | 10/2004 | Hui |
| 6,874,625 | B2 | 4/2005 | Chang |
| 6,951,278 | B2 | 10/2005 | Pettigrew et al. |
| 7,051,874 | B2 * | 5/2006 | Perez et al. ............... 206/1.5 |
| 7,431,154 | B2 * | 10/2008 | Perez et al. ............... 206/1.5 |
| 2001/0047947 | A1 | 12/2001 | Lau |
| 2002/0011426 | A1 | 1/2002 | Byrne et al. |
| 2002/0112974 | A1 | 8/2002 | Lau |
| 2003/0015441 | A1 | 1/2003 | Kang et al. |
| 2003/0034258 | A1 | 2/2003 | Lee |
| 2003/0168361 | A1 | 9/2003 | Lau |
| 2003/0196918 | A1 | 10/2003 | Lau |
| 2004/0129587 | A1 | 7/2004 | Lax et al. |
| 2004/0173481 | A1 | 9/2004 | Choi et al. |
| 2004/0178091 | A1 | 9/2004 | Lau |
| 2005/0098453 | A1 | 5/2005 | Lax |
| 2005/0173273 | A1 | 8/2005 | Marsilio et al. |
| 2005/0269223 | A1 | 12/2005 | Wawrzynowski |
| 2005/0279143 | A1 | 12/2005 | Belden, Jr. et al. |
| 2005/0279657 | A1 | 12/2005 | Bjerregaard et al. |
| 2006/0191809 | A1 | 8/2006 | Heuser et al. |
| 2007/0102310 | A1 | 5/2007 | Osborn et al. |
| 2007/0193898 | A1 | 8/2007 | Hu |
| 2007/0215498 | A1 | 9/2007 | Barnette et al. |

FOREIGN PATENT DOCUMENTS

| | | |
|---|---|---|
| CN | 2418106 Y | 2/2001 |
| CN | 2466763 Y | 12/2001 |
| CN | 2624347 Y | 7/2004 |
| JP | 2002019871 A | 1/2002 |
| JP | 2004182315 A | 8/2004 |
| JP | 2005035664 A | 2/2005 |
| WO | WO2005019065 A | 3/2005 |

OTHER PUBLICATIONS

Supplementary European Search Report of the European Patent Office, Application No. EP07800984.2, Date of Completion of the Research Jun. 3, 2009.

The First Notification of Office Action of the State Intellectual Property Office of China, Application No. 200780030606.8, Date of Issue Apr. 29, 2010.

Office Action of the United States Patent and Trademark Office, U.S. Appl. No. 11/465,687, Mail Date Oct. 28, 2008.

Office Action of the United States Patent and Trademark Office, U.S. Appl. No. 11/465,687, Mail Date Apr. 29, 2009.

Office Action of the United States Patent and Trademark Office, U.S. Appl. No. 11/465,687, Mail Date Aug. 19, 2009.

Office Action of the United States Patent and Trademark Office, U.S. Appl. No. 11/465,745, Mail Date Jan. 13, 2009.

Office Action of the United States Patent and Trademark Office, U.S. Appl. No. 11/465,745, Mail Date Nov. 2, 2009.

Office Action of the United States Patent and Trademark Office, U.S. Appl. No. 11/456,502, Mail Date Aug. 18, 2008.

Office Action of the United States Patent and Trademark Office, U.S. Appl. No. 11/456,502, Mail Date Apr. 29, 2009.

Office Action of the United States Patent and Trademark Office, U.S. Appl. No. 11/456,502, Mail Date Nov. 27, 2009.

The Second Office Action from the State Intellectual Property Office of China issued on Nov. 11, 2010 in Chinese Patent Application No. 200780030606.8 for "Security Disk Protective Enclosure" (English translation enclosed).

* cited by examiner

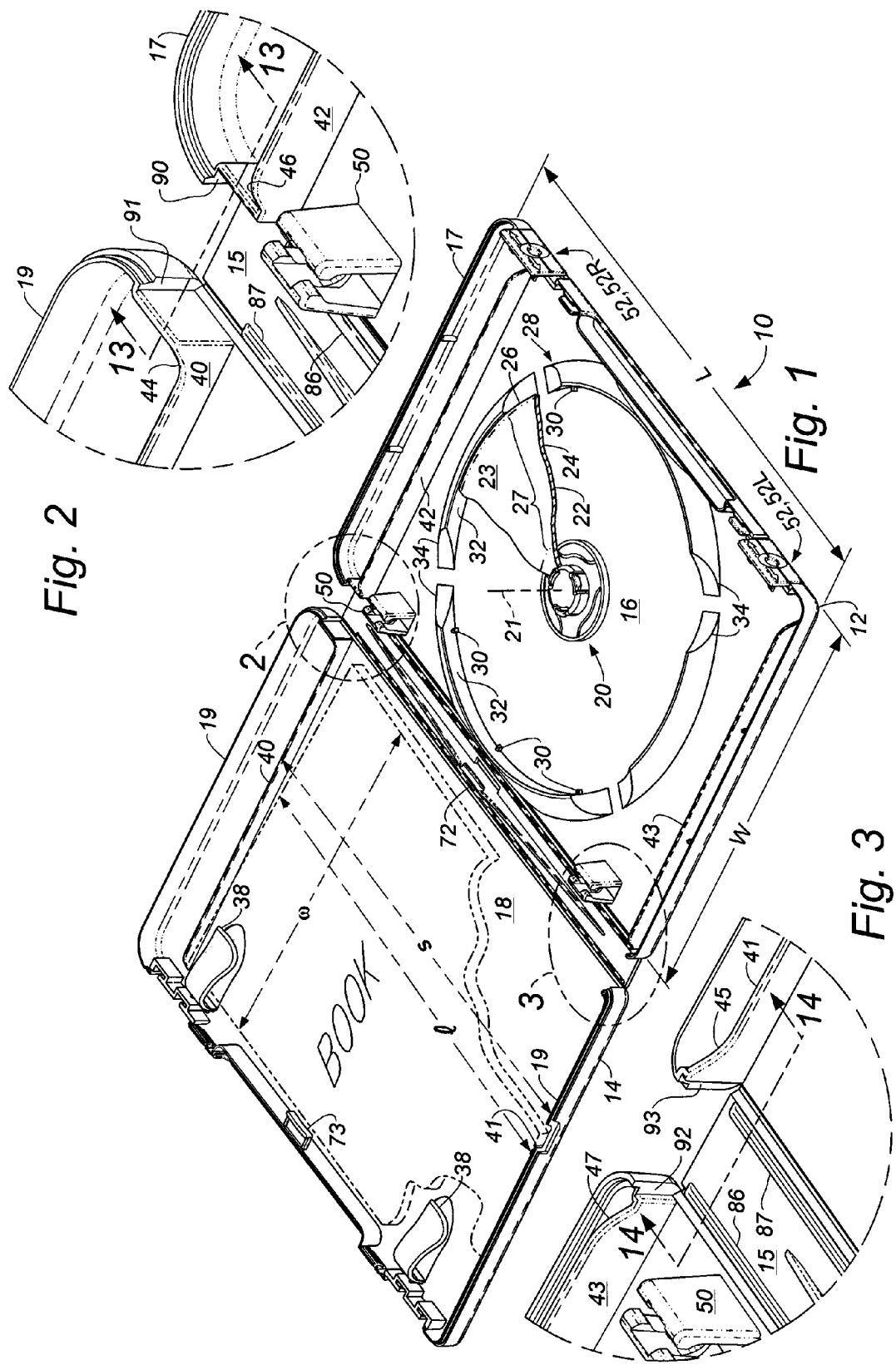

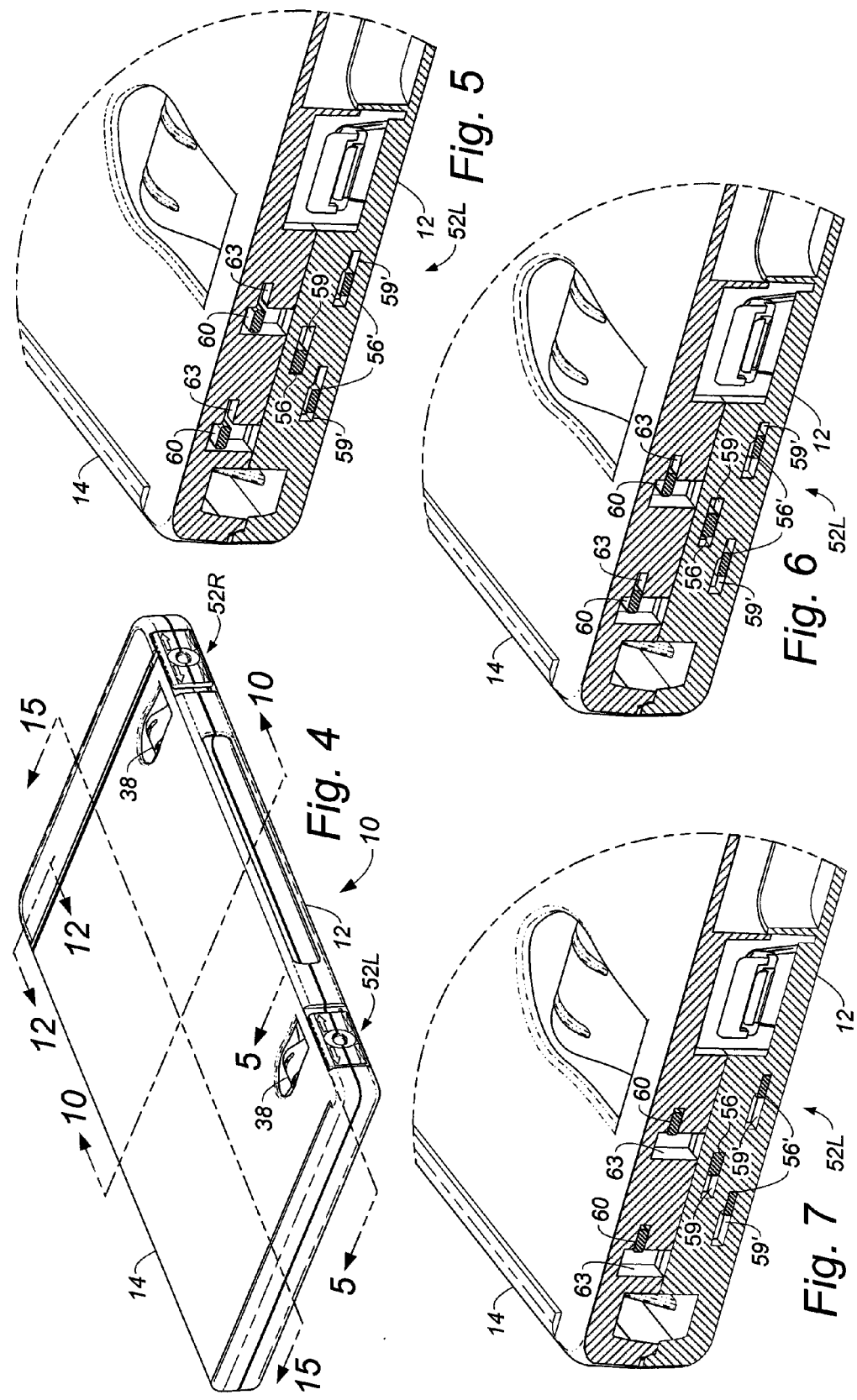

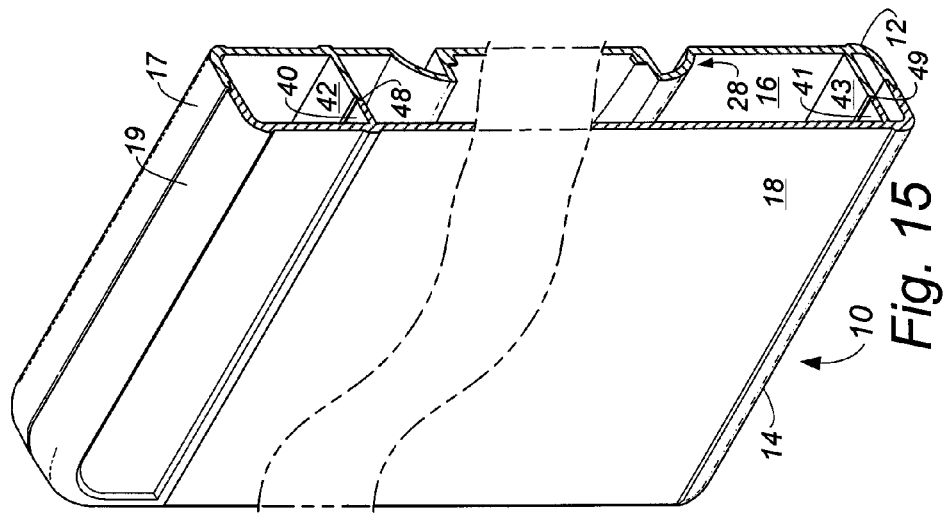
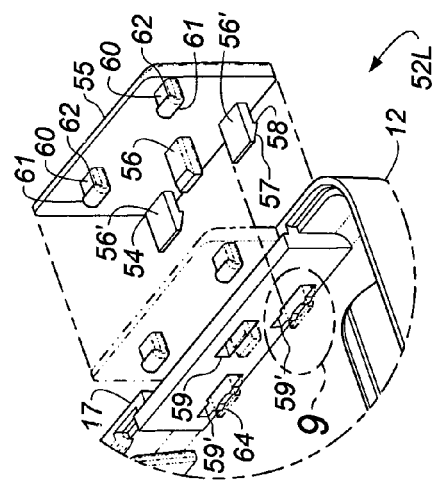
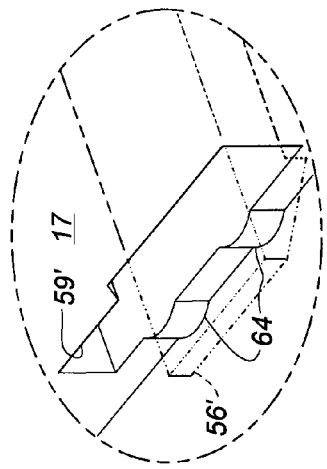
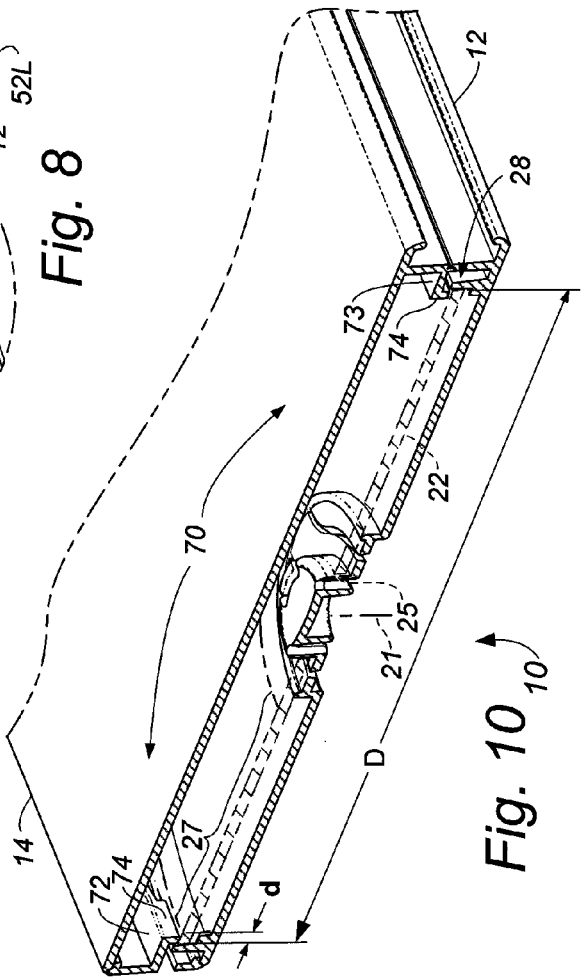
Fig. 15
Fig. 8
Fig. 9
Fig. 10

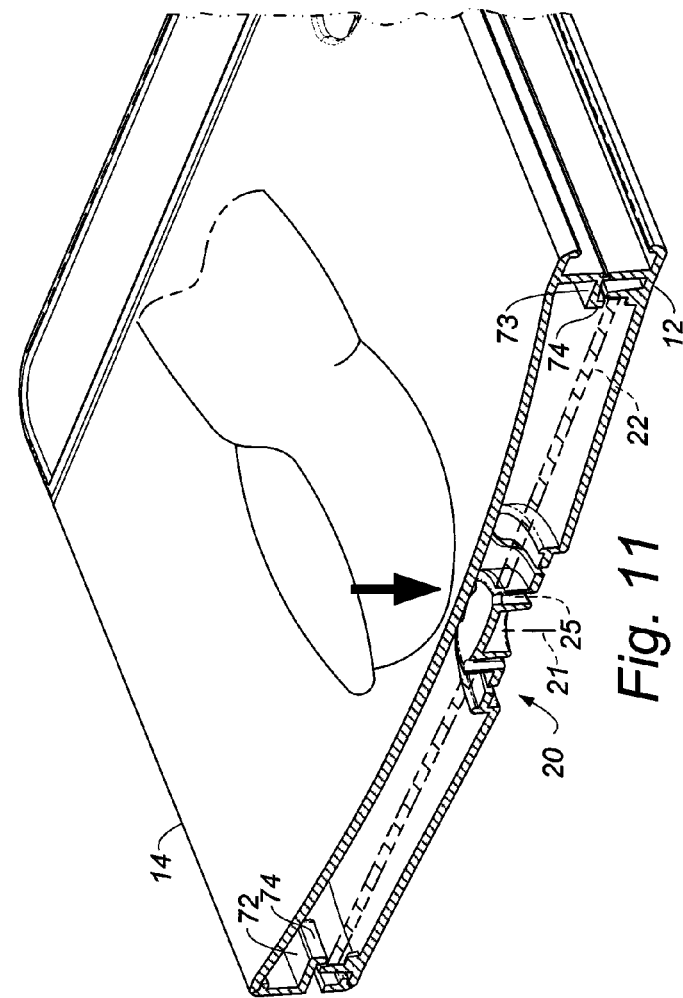
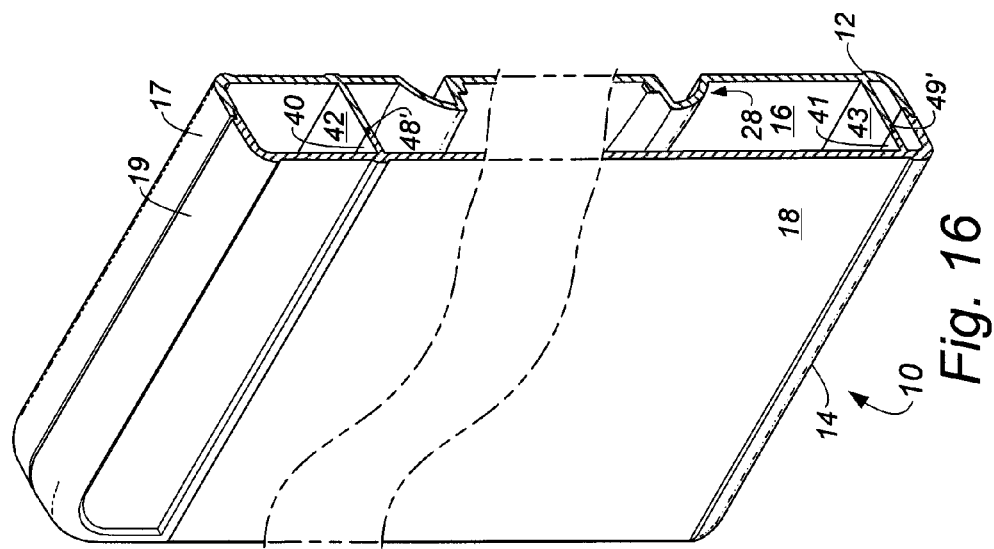

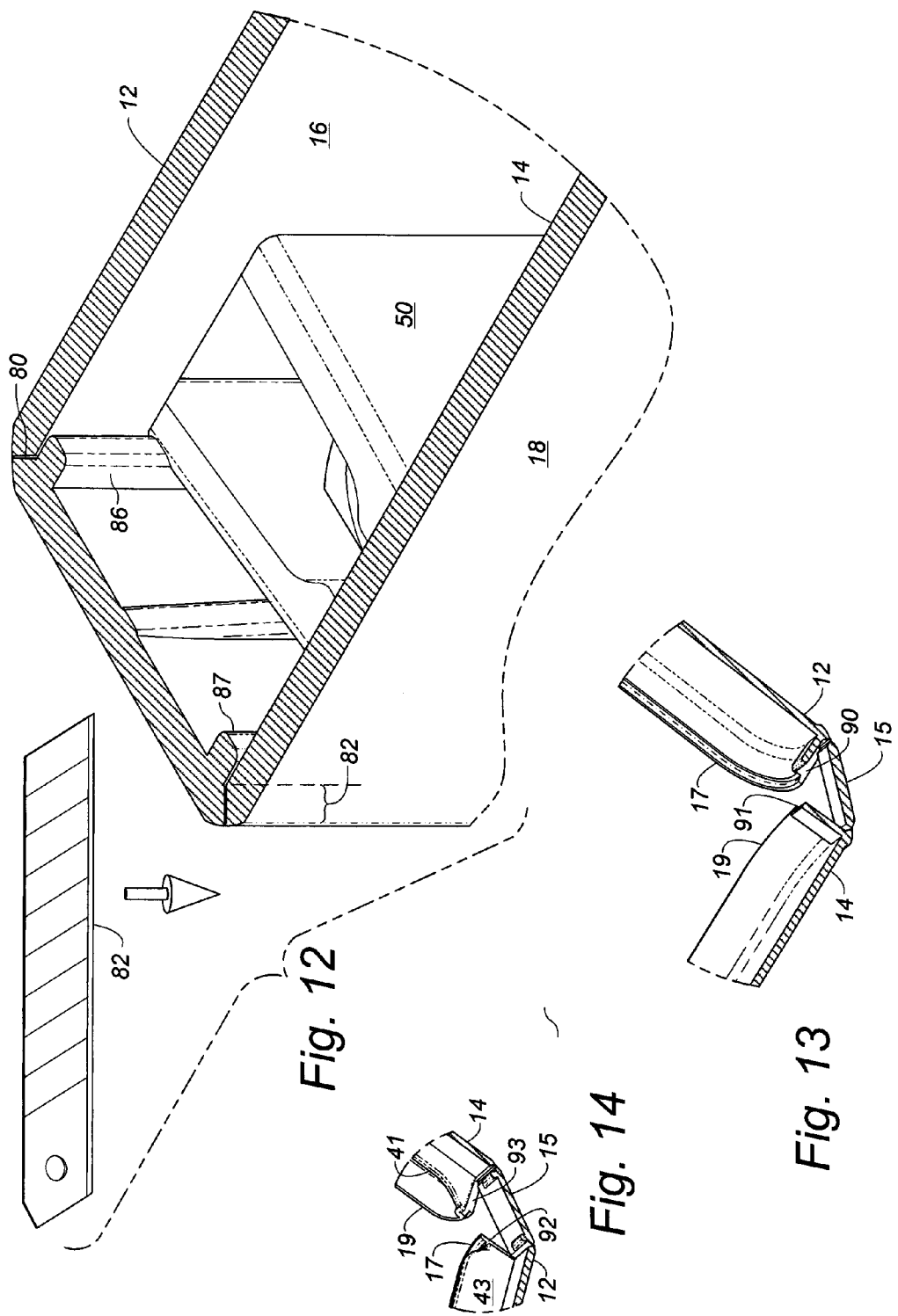

SECURITY DISK PROTECTIVE ENCLOSURE

CROSS-REFERENCE TO RELATED APPLICATION

The present Application is a continuation of U.S. patent application Ser. No. 11/465,687, titled "Security Disk Protective Enclosure," filed on Aug. 18, 2006, now abandoned, the contents of which are incorporated in this disclosure by reference in their entirety.

BACKGROUND

The present invention relates to optical data disks such as compact disks (CDs) and video disks (DVDs) that have central circular locating openings, and more particularly to devices for holding and/or protectively enclosing such disks for storage of same.

Protective containers for the disks in common use have a central pedestal for supportively gripping the disc by engaging the central opening without contacting either side of the disk within data-containing regions thereof. Such containers, particularly those for high-value media, are made substantially oversize in order to render concealment by potential shoplifters difficult. Typically, such containers have a width that is not much greater than an outside diameter of the disk, but have a length that is substantially greater. It is also customary to provide a pair of spring clamps in the lid for holding descriptive literature, such as an article in the form of a printed card or book. Typically, the article is rectangular, having a width that is nearly the same as the disk diameter, and a length that is substantially less than the case length. Consequently, the article can become considerably displaced from its intended position and creating an unsightly appearance because the clamps typically do not positively hold the article in position, particularly when there are a number of pages or folded layers. Moreover, since typical containers of this type have rounded corners, the article is subject to becoming "dog-eared" or otherwise damaged from impact with corners of the case.

In addition, disk containers of the prior art typically exhibit one or more of the following disadvantages relating to security from theft of the disk from the container:

1. They are ineffective in that the disk can easily become disengaged from the pedestal in normal and/or expected handling of the device, as well as during deliberate forcible deformation directed to unauthorized extraction of the disk;

2. They are easily opened in an unauthorized manner by slicing living "hinges" that connect lid and base portions of the container;

3. They are difficult to open in an authorized manner when they are provided with adhesive security devices securing the container in its closed condition; and 4. They are excessively complex, involving high tooling costs, expensive quality control, and/or high rejection rates in production.

Thus there is a need for a protective disk container that overcomes at least some of the disadvantages of the prior art.

SUMMARY

The present invention meets this need by providing a molded protective disk container that is particularly effective in preventing theft of its contents, and that is inexpensive to produce, and easy to use. In one aspect of the invention, the container includes a case comprising a base portion and a lid portion that are hingedly connected for opening and closing of the case, and a pedestal structure for engaging the central opening of the disk, and a latch structure comprising a latch member that is formed for snap engagement with the base or lid portion, the latch member being movably supported between a first position wherein the latch member also engages the other of the base and lid portions in a closed condition of the case for preventing opening of the case, and a second position permitting opening of the case. The one of the base and lid portions can be formed with a detent projection for yieldably holding the latch member in one of the first and second positions thereof. The detent projection can be one of a spaced pair of detent projections for yieldably holding the latch member in each of the first and second positions.

The latch member in its snap-engaged condition can be slidably supported on the one of the base and lid portions. Also, the latch member can include an armature member and a plurality of projecting headed support prongs, each of the prongs having snap sliding engagement with a guide slot that is formed in the one of the base and lid portions. The detent projection can be located for contacting one of the headed support prongs of the latch member to yieldably hold the latch member in one of its positions. The latch member can further include a projecting latch prong that enters a generally L-shaped slot formed in the other of the base an lid portions when the case is manipulated to the closed condition with the latch member in the second position. Preferably there is a spaced pair of the latch structures for enhanced security of the case in its closed and locked condition. The latch structures can be oppositely handed and laterally aligned, with the latch members being moved toward each other in one of the first and second positions, and away from each other in the other of the first and second positions. Preferably the first positions of the latch members is moved toward each other for avoiding unintended unlocking during normal handling of the case.

In another aspect of the invention, the container includes a case including a base having a base panel portion, and a lid, the base and the lid being hingedly connected for opening and closing of the case, a pedestal structure projecting forwardly from the base panel portion for engaging the central opening of the disk on a pedestal axis (the disk also having front and back face surfaces, and an outer perimeter, a data region of the disk extending inwardly from a radial distance D such as approximately 1.5 mm within the outer perimeter), and an edge support structure projecting forwardly from the base panel portion and being adapted for contacting the rear surface of the disk outside of the data region, a portion of the edge support structure extending forwardly of the front disk surface in concentric relation to the pedestal axis; and a disk presser structure having a pair of tab members for contacting the front surface of the disk outside of the data region, the disk presser structure moving to an open condition during opening of the case and moving to a clamping condition wherein the tab members project downwardly within the portion of the edge support that extends forwardly of the front surface of the disk during closing of the case. At least one of the tab members can be fixedly supported relative to the lid. Also, the container can further include generally rectangular spine portion, the base portion and the lid portion being hingedly connected along opposite side extremities of the spine portion, and with at least another of the tab members being rigidly supported relative to the spine portion.

In a further aspect of the invention, the container includes the case with the base, lid, and side wall portions, the base and the lid having respective base and lid panel portions and being hingedly connected for opening and closing of the case, and a pedestal structure for engaging the central opening of the disk, the case having a case length and a case width in its closed condition, the case length being arbitrarily greater than the case width for hindering concealment of the container, the lid including means for yieldably clamping an article other than the disk against the lid panel portion; the lid further including a first lid partition extending from the lid panel portion downwardly in a transverse direction relative to one of the case length and width for confining the article within a compartment having a compartment length being substantially less than the one of the case length and width in the closed condition of the case; and the base further including a first base partition extending from the base panel portion upwardly generally in line with the first lid partition and having proximate contact therewith in the closed condition of the case for enhanced confinement of the article within the compartment. The each of the first lid and base partitions can extend respectively to sidewall portions of the lid and base for enhanced structural integrity of the case. The one of the case length and width can be the case length. The first lid and base partitions are preferably spaced substantially from one end of the case, the case further including respective second lid and base partitions in parallel spaced relation to the first lid and base partitions and spaced from an opposite end of the case for blocking movement of the article into an outer corner of the case. The container can further include the spine portion, the base portion and the lid portion being hingedly connected along opposite side extremities of the spine portion between the first and second lid and base partitions. Preferably, sidewall portions of at least one of the base and lid portions have endwise overlapping proximal engagement with opposite ends of the spine portion in the closed condition of the case for enhanced security of the container against theft of the disk. Preferably the spine portion extends lengthwise beyond the first and second lid and base partitions in facing relation to sidewall portions of the at least one of the base and lid for further enhanced security of the case. Each of the base and lid portions can have proximal facing contact with the spine portion within respective base and lid contact regions along corresponding side edges of the spine portion in a closed condition of the case, the case preferably further including: a base rib member rigidly projecting from one of the base and spine portions along the base contact region for blocking the base contact region; and a lid rib member rigidly projecting from one of the lid and spine portions along the lid contact region for blocking the lid contact region, thereby preventing entry of a bladed instrument into the case through the base and lid contact regions for enhanced security of the container against theft of the article.

For further enhanced confinement of the article within the compartment, at least a substantial portion of the proximate contact between the first lid and base partitions is substantially inclined relative to the base panel portion. Alternatively, the first lid and base partitions can have overlapping edge portions in the closed condition of the case for the further enhanced confinement of the article within the compartment.

In yet another aspect of the invention, the container includes the case including integrally formed base, lid, spine, and side wall portions, the base and the lid portions having the base and lid panel portions and being hingedly connected to the spine portion, each of the base and lid portions having the proximal facing contact regions against the spine portion in the closed condition of the case; the base and lid rib members along the base and lid contact regions for blocking the contact regions, thereby preventing entry of a bladed instrument into the case through the base and lid contact regions for enhanced security of the container against theft of the article. Preferably, sidewall portions of at least one of the base and lid portions have endwise overlapping proximal engagement with opposite ends of the spine portion in the closed condition of the case for enhanced security of the container against theft of the disk.

DRAWINGS

These and other features, aspects, and advantages of the present invention will become better understood with reference to the following description, appended claims, and accompanying drawings, where:

FIG. 1 is a perspective view of a protective disk case according to the present invention, the case being in an open condition;

FIG. 2 is a detail perspective view within region 2 of FIG. 1;

FIG. 3 is a detail perspective view within region 3 of FIG. 1;

FIG. 4 is a perspective view as in FIG. 1, showing the case in a closed and unlatched condition;

FIG. 5 is a detail sectional perspective view on line 5-5 of FIG. 4, showing portions of a latch in an unlocked position;

FIG. 6 is a sectional perspective view as in FIG. 5, showing the latch in an intermediate position;

FIG. 7 is a sectional perspective view showing the latch in a locked position;

FIG. 8 is a perspective view showing snap-engagement of the latch with a base portion of the case;

FIG. 9 is a detail perspective view within region 9 of FIG. 8;

FIG. 10 is a sectional perspective view of the case of FIG. 1 on line 10-10 of FIG. 4;

FIG. 11 is a sectional perspective view as in FIG. 10, showing deformation of the case of FIG. 1 by application of an external force;

FIG. 12 is a detail sectional perspective view on line 12-12 of FIG. 4, showing blocking of an approaching blade;

FIG. 13 is a detail sectional perspective view on line 13-13 of FIG. 2, showing the case of FIG. 1 in a partially open condition;

FIG. 14 is a detail sectional perspective view as in FIG. 13, on line 14-14 of FIG. 3;

FIG. 15 is a fragmentary sectional perspective view on line 15-15 of FIG. 4; and FIG. 16 is a sectional perspective view as in FIG. 15, showing an alternative configuration of the case of FIG. 1.

DESCRIPTION

The present invention is directed to a security disk container that is particularly effective for securely and protectively storing disks such as CDS and DVDs. With reference to FIGS. 1-16 of the drawings, a security disk case 10, which may have a transparent jacket (not shown) bonded thereto for displaying printed material, includes a base 12, a lid 14, and a spine 15 that movably connects the base and lid. In an exemplary configuration, the case 10 is an integrally formed molded member, so-called "living hinges" being formed along opposite edges of the spine 15. The base 12 and lid 14 include respective panel portions 16 and 18, and respective perimeter side portions 17 and 19 that snap together in overlapping adjacency in a closed condition of the case 10, the spine 15 and the side portions 17 and 19 together forming four side walls of the case 10, the lid panel portion 18 forming a front wall, the base panel portion 16 forming a rear wall. In further description of the case 10, the terms "front" and "forward" with respect to the base refer to a direction toward the lid 14 in the closed condition of the case 10; conversely, "rear", "rearward", and "back" refer to a direction away from the lid portion.

A hub or pedestal 20 of the case projects forwardly from the base panel portion 16 on a pedestal axis 21 for supportively engaging an optical data disk 22 having front and rear face surfaces 23 and 24, a circular central opening 25, and a periphery 26 of diameter D, a data region 27 of the disk extending inwardly from a short distance d within the periphery and having an inside diameter somewhat greater than that of the central opening 25 as shown in FIGS. 1 and 10. An edge-support structure 28 of case 10 also projects forwardly on the base panel portion 16 in concentric relation to the pedestal axis 21 proximate the periphery 26 of the disk 22. The edge-support structure 28 is formed with a circumferentially spaced plurality of supports 30 for stabilizing the disk 22 against tipping, and a rim portion 32 that projects forwardly of the supports 30 beyond the front surface 23 of the disk for protecting the disk 22 proximate the periphery 26 while the disk is engaged with the pedestal 20. The edge-support portion is also formed with at least one pair of finger depressions 34 for permitting opposite perimeter portions of the disk 22 to be grasped by a user of the container 10, the rim portion 32 being interrupted by the finger depressions 34.

It is customary with disk containers, particularly those intended for marketing high-valued media, to make the container substantially oversized in order to render concealment by potential shoplifters difficult. Typically, such containers have a case width W that is not much greater than the disk diameter D, but a case length L that is substantially greater. It is also customary to provide a pair of spring clamp members 38 in the lid 14 for holding descriptive literature, such as an article 39 in the form of a printed card or book as shown in FIG. 1. Typically, the article 39 is rectangular, having a book width ω that is nearly the same as the disk diameter D, and a book length l that is substantially less than the case length L. Consequently, the article 39 can become considerably displaced from its intended position and creating an unsightly appearance, because the clamp members 38 typically do not positively hold the article 39 in position, particularly when it has a number of pages or folded layers. Moreover, since typical containers of this type have rounded corners, the article 39 is subject to becoming "dog-eared" or otherwise damaged from impact with corners of the case. According to the present invention, the disk case 10 is provided with interior partitions for forming a compartment of reduced size, whereby the article 39 is closely confined. More particularly, the lid 14 is formed with a transverse first lid partition 40 and a second lid partition 41, the lid partitions 40 and 41 being parallel-spaced inwardly from opposite ends of the lid 14, being spaced apart a compartment spacing s that is only slightly greater than the book length l, thereby confining the article 39 substantially to a fixed location away from opposite ends of the case 10.

Also, the base 12 has a first base partition 42 and a second base partition 43 positioned and configured for generally edgewise proximal engagement with corresponding lid partition members 40 and 41 as indicated, respectively, at 48 and 49 in FIG. 15 for improved confinement of the article 39 within the compartment spacing s. Substantial portions of the edgewise proximal engagement are substantially inclined relative to the lid panel portion for further improved confinement of the article 39 as further explained below. More particularly, edge portions of the first and second lid partitions 40 and 41 are inclined away from the lid panel portion 18 to respective intersections with the lid side portion 19 as indicated at 44 in FIGS. 2 and 45 in FIG. 3; also, corresponding edge portions of the first and second base partitions 42 and 43 are inclined toward from the base panel portion 16 to respective intersections with the base side portion 17 as indicated at 46 in FIGS. 2 and 47 in FIG. 3. For example, a sheet extending proximate mating edges of base and lid partitions, which might otherwise protrude between them, is prevented from such undesired movement by the sloping portions of the mating edges. This blockage is effective unless the sheet happens to be deformed in correspondence with the sloping portions of the mating edges, that being unlikely. Moreover, the connections of the lid partitions 40 and 41 with the lid side portion 18 and the connections of the base partitions 42 and 43 with the base side portion 19 substantially improve the structural integrity of the side portions at their extremities proximate opposite ends of the spine 15.

FIGS. 1-3 show an optional pair of hinge posts 50 for supporting one or more disk-carrying trays, such as disclosed in U.S. Pat. No. 6,554,132 to the present inventor and pending application Ser. No. 11/182,541, entitled Disk Protective Enclosure, which was filed Jul. 15, 2005. Both disclosures are incorporated herein in their entirety by these references.

With particular reference to FIGS. 1 and 4-9, the case 10 incorporates an oppositely handed pair of latch structures 52, individually designated left latch structure 52L and right latch structure 52R, for selectively locking the case in its closed condition, with FIGS. 5-9 showing the left catch structure in greater detail, the right latch structure being of the same form but oppositely handed. As shown in FIG. 8, the left latch structure 52L includes a latch member 54 having an armature 55 for manipulation by a user of the case 10, a plurality of support prongs 56 for sliding engagement with respective guide slots 59 that are formed in a portion of the base side portion 17, and at least one latch prong 60 for selective engagement with the lid side portion 19 as further described herein. The latch members are moved apart to respective lock positions as shown in FIGS. 1 and 4, being moved toward each other to lock the case 10 as described below. As shown in the drawings, an exemplary and preferred form of the latch member 54 has three of the support prongs in a triangular pattern, and a laterally spaced pair of the latch prongs 60.

Two of the support prongs, designated 56' are headed, having a ramped end extremity 57 and a shoulder surface 58 for hooked snap engagement through a corresponding guide slot of modified form and designated 59' for receiving the enlarged end extremities of the support prongs 56'. The latch member 54 thus has snap engagement with the base 12, being inserted while aligned in the unlock position, the support prongs 56' being deflected slightly in opposition to the support prong 56 until the latch member is fully seated in sliding engagement with the base as depicted by broken lines in FIGS. 8 and 9. Similarly, each of the latch prongs 60 is headed, having a rounded end extremity 61 and a shoulder surface 62 for hooked engagement through a corresponding generally L-shaped latch slot 63 that is formed in the lid side portion 19. The engagement of the latch prongs 60 becomes hooked when the latch member is moved from the unlocked position shown in FIGS. 1, 4, 5, 8, and 9, to a locked position shown in FIG. 7. More particularly, the latch slots 63 are vertically open downwardly as indicated at 64 for receiving the latch prongs 60 as the lid 14 is being closed, and having a side extension 65 for laterally receiving the latch prong as the latch member 54 is moved through an intermediate position shown in FIG. 6 to the lock position shown in FIG. 7. As further shown in FIGS. 8 and 9, the base side portion 17 is formed with two pairs of inwardly projecting detent members 64 for frictional engagement with two of the support prongs 56 for yieldably holding the latch member in positions to which it has been moved.

As further shown in FIGS. 1, 10, and 11, the case 10 is provided with a disk presser structure 70 having a first tab member 72 substantially rigidly supported relative to the spine 15 and a second tab member 73 substantially rigidly supported relative to the lid 14 opposite the spine, the tab members 72 and 73 being disposed oppositely relative to the pedestal axis 21 for contacting the disk 22 outside of the data region 27 in the closed condition of the case 10. More particularly, each of the tab members 72 and 73 includes a downwardly projecting tab extension 74 that extends below the top of the rim portion 32 of the edge support structure 28 for contacting the disk 22 within the radial distance d that extends between the data region 27 and the periphery 26. Typically, the distance d is approximately 1.5 mm on optical disks having the outside diameter D of approximately 120 mm. The disk presser structure 70 according to the present invention advantageously prevents the disk 22 from becoming dislodged from the pedestal 20, even when the case 10 is subjected to downward pressure on the lid 14 concentric with the pedestal axis 21 sufficient to release the disk, in a manner producing deformation of the case that would otherwise remove the disk from the pedestal 20 and permit extraction thereof between separated portions of the base and lid side walls 17 and 19, as shown in FIG. 11. In this respect, the projection of the rim portion 32 above the front surface 23 serves to lock the disk in concentric relation with the pedestal axis 21 so that as the external deforming force is removed the tab members 72 can urge the disk back into seated engagement with the pedestal 20.

As shown in FIGS. 1-3 and 12, the case 10 is provided with rib members that extend proximate opposite sides of the spine when the case is closed for security against cutting the lid 14 and/or the base 12 from the spine along the hinged (living hinge) connections therebetween. In the closed condition of the case 10, there is proximal facing contact between the base 12 and the spine 15 in a base contact region 80 along one side edge of the spine, and between the lid 14 and the spine in a lid contact region 82 along an opposite side edge of the spine. It has been observed that shoplifters sometimes succeed in unauthorized removal of the disk 22 from prior disk containers by slicing the living hinge with a blade such as that indicated at 84 in FIG. 12, the blade being inserted through one or the other of the contact regions 80 and 82 and moved in the direction of the arrow in FIG. 12. According to the present invention, a base rib member 86 is formed on the spine 15 along the base contact region 80, and a lid rib member 87 is similarly formed along the lid contact region 82 for blocking advancement of the blade 84, thereby making theft of the disk in the manner described above difficult. It will be understood that the rib members 86 and 87 can be alternatively located, respectively, on the base 12 and lid 14 to provide the same blockage of the blade 84.

As further shown in FIGS. 1-3, 13, and 14, the base and lid side portions 17 and 19 have endwise proximal engagement with opposite ends of the spine 15 in the closed condition of the case 10 for further enhanced security of the container against theft of the disk. More particularly, a first side shoulder 90 of the base side portion 17 and a first side shoulder 91 of the lid side portion 19 move into facing relation to one end of the spine 15 as the case 10 is closed as shown in FIG. 13. Similarly, a second side shoulder 92 of the base side portion 17 and a first side shoulder 93 of the lid side portion 19 move into facing relation to an opposite end of the spine 15 as the case is closed as shown in FIG. 14.

With further reference to FIG. 16, an alternate configuration of the disk case 10 has the lid and base partitions 40, 41, 42, and 43 configured for overlapping proximate contact as indicated at 48' and 49' for enhanced confinement of the article 39 within the compartment spacing S. More particularly, a first overlapping engagement 48 of the first lid and base partitions 40 and 42, and a second overlapping engagement 49 of the second lid and base partitions 41 and 43 is provided in the form of complementary notches along substantial portions of the respective partitions. It will be understood that the overlapping engagement can alternatively be provided by slightly offsetting each partition relative to counterpart.

Although the present invention has been described in considerable detail with reference to certain preferred versions thereof, other versions are possible. For example, the case 10 can be configured for incorporating an additional pedestal 20 on the lid panel portion 18, such as disclosed in the above-referenced U.S. Pat. No. 6,554,132 and pending Application Ser. No. 11/182,541. In these examples, the lid panel portion functions as a base panel portion, and disk-carrying trays have equivalent structure. Therefore, the spirit and scope of the appended claims should not necessarily be limited to the description of the preferred versions contained herein.

What is claimed is:

1. A container for a disk of the type having a central opening, front and back face surfaces, and an outer perimeter, the container comprising:
a case comprising a base portion and a lid portion, the base portion and the lid portion being hingedly connected for opening and closing of the case, and a holder structure for engaging the central opening of the disk;
a spaced pair of latch structures each comprising a latch member, the latch members and one of the base and lid portions being formed for snap engagement therewith, with the latch members being slidably supported on one of the base and lid portions for movement in either direction between a first position wherein the latch members also engage the other of the base and lid portions in a closed condition of the case for preventing opening of the case, and a second position permitting opening of the case;
wherein the latch members each comprise an armature member and a plurality of headed support prongs projecting from the armature member, each of the prongs having snap sliding engagement with a guide slot formed in one of the base and lid portions;
wherein the one of the base and lid portions is formed with a detent projection located for contacting one of the headed support prongs of the latch members to yieldably hold the latch members in one of the first and second positions thereof; a latch prong projecting from the latch members, the latch prong entering an L-shaped slot formed in the other of the base and lid portions when the case is manipulated to the closed condition with the latch members in the second position; and
the latch structures are oppositely handed and laterally aligned, wherein the latch members are moved toward each other in one of the first and second positions and away from each other in the other of the first and second positions.

2. The container of claim 1, wherein the detent projection is one of a spaced pair of detent projections for yieldably holding the latch members in each of the first and second positions.

3. The container of claim 1, wherein the first positions of the latch members is moved towards each other.

* * * * *